Patented Oct. 22, 1940

2,218,569

UNITED STATES PATENT OFFICE 2,218,569

GLYCOSIDES OF PENTOSE ETHERS

Elwood V. White, Moscow, Idaho, assignor to The Dow Chemical Company, Midland, Mich., a corporation of Michigan No Drawing. Application September 13, 1939, Serial No. 294,688

5 Claims. (Cl. 260—210)

This invention relates to new compounds having the general formula

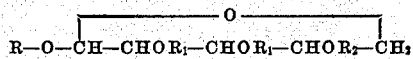

wherein R is an alkyl or an aryl group, one of the radicals $R_1$ is an alkyl group, the other radical $R_1$ representing an acyl or an alkyl group, and the radical $R_2$ being an acyl group. Compounds having the structural configuration and containing substituent groups of the type set forth in the foregoing formula are useful as solvents, as intermediates in the preparation of pentitol ethers, and as plasticizers for the polysaccharide ethers and particularly for the hemi-cellulose ethers to which they are related closely in structure. The new compounds may be made from the halogen acyl pentose ethers, preparation of which is described in my co-pending application, Serial No. 294,687, filed concurrently herewith. The reaction whereby the new compounds may be prepared is illustrated by the following equation, wherein the pentose structure is that of xylose

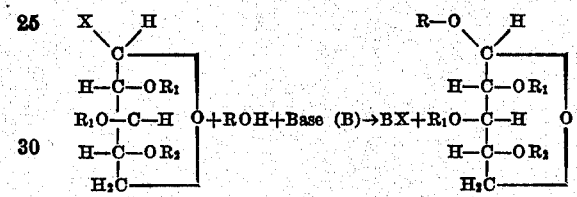

In the equation R, $R_1$ and $R_2$ have the previously assigned values, X is chlorine or bromine, and B represents a base capable of reacting with a hydrogen halide to form a metal salt thereof.

The reagent ROH shown in the foregoing equation may be a monohydric phenolic compound such as phenol, tribromo-phenol, cresol, ethyl-phenol, para-tertiary-butyl phenol, phenyl-phenol, alpha- or beta-naphthol, or halogen substitution products of the foregoing, or it may be a primary monohydric alcohol such as ethyl, n-butyl, hexyl, lauryl, or similar aliphatic alcohols, or cyclohexanol, menthol, geraniol, or the like.

When phenols are employed to provide the radical R, the reaction is most conveniently carried out utilizing the alkali metal salts of the phenol such, for example, as sodium phenolate. The reaction between the alcohols and the halogen acyl pentose ethers proceeds regularly and smoothly in the presence of a base such as an alkaline earth carbonate or silver carbonate.

The following example illustrates the practice of the invention and the preparation of the new compounds:

500 cc. of a dry ethereal solution containing 0.25 mole of 1-bromo 4-acetyl 2.3-diethyl xylose is added to an anhydrous methanol solution of the sodium salt of 2.4.6-tribromo-phenol containing 0.30 mole of the latter reagent. The reaction mixture is allowed to stand at room temperature for 16 hours and is then diluted with water. The supernatant ethereal layer containing the new glycoside is washed with 5 per cent sodium hydroxide solution to remove unconverted phenolic material, sodium bromide, and other water-soluble compounds which may be present in small quantity. The remaining ethereal solution is decolorized by means of charcoal in known manner, filtered to remove the charcoal, dried over anhydrous sodium sulphate, and the ether is removed from the product by distillation. The residual syrup crystallizes upon standing, and after recrystallization from methanol has a melting point of 131° C. The new product is shown by analysis to be 2.4.6-tribromo-phenyl 4-acetyl 2.3-diethyl xyloside, the formula of which is

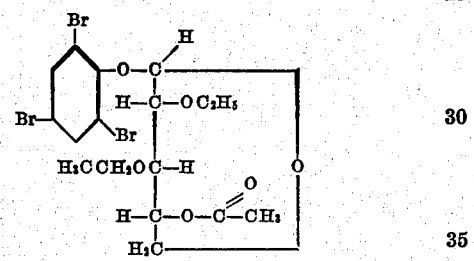

By a similar procedure, a large variety of monohydric phenols, including those previously named, and their halogen substitution products were caused to react with bromo ethyl acetyl xylose or with other halogen acyl alkyl pentoses, and the products obtained were all new glycosides of the pentose ether esters, and were strictly analogous to the compound shown in the example. Similarly, when bromo acetyl ethyl xylose is reacted with a monohydric primary alcohol, aliphatic glycosides of xylose ether esters are prepared. All of the new compounds are compatible with ethyl cellulose and similar celluose ethers and with ethyl hemi-cellulose and similar pentosan ethers. The liquid products are useful as softening plasticizers for such ethers while the high melting solids typified by the tribomo-phenol glycoside of the example are compatible with the polysaccharide ethers and serve as substitutes for resinous components in compositions comprising such ethers. The new compounds find application as intermediates in the preparation of ether-esters and ethers of pentahydric alcohols which are slightly hygroscopic materials somewhat analogous to the glycerol derivatives and erythritol derivatives in many respects.

I claim:

1. A compound having the general formula

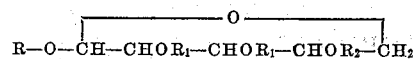

wherein R is selected from the class consisting of alkyl and aryl radicals, one of the radicals $R_1$ is an alkyl group, the other being selected from the class consisting of alkyl and acyl radicals, and $R_2$ is an acyl radical.

2. A compound having the formula set forth in claim 1, wherein R is an aryl radical.

3. A compound having the formula set forth in claim 1, wherein the acyl radical is acetyl.

4. A compound having the formula set forth in claim 1, wherein one radical $R_1$ is an ethyl radical.

5. An aryl glycoside of an ethyl pentose acetate, wherein the ethyl group is in one of the positions 2 and 3, the other of positions 2 and 3 is occupied by a member of the class consisting of ethyl and acetyl, and the 4 position is occupied by acetyl.

ELWOOD V. WHITE.